US009904351B2

(12) United States Patent
Rahardjo et al.

(10) Patent No.: US 9,904,351 B2
(45) Date of Patent: *Feb. 27, 2018

(54) SYSTEMS AND METHODS FOR POWER SUPPLY CONFIGURATION AND CONTROL

(71) Applicant: Dell Products L.P., Round Rock, TX (US)

(72) Inventors: Johan Rahardjo, Austin, TX (US); Girish Das, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 82 days.

This patent is subject to a terminal disclaimer.

(21) Appl. No.: 15/018,829

(22) Filed: Feb. 8, 2016

(65) Prior Publication Data
US 2016/0162018 A1    Jun. 9, 2016

Related U.S. Application Data

(63) Continuation of application No. 13/746,113, filed on Jan. 21, 2013, now Pat. No. 9,280,191.

(51) Int. Cl.
*G06F 1/32* (2006.01)
*G06F 1/00* (2006.01)
*G06F 1/26* (2006.01)

(52) U.S. Cl.
CPC ............. *G06F 1/3296* (2013.01); *G06F 1/00* (2013.01); *G06F 1/26* (2013.01); *G06F 1/3206* (2013.01)

(58) Field of Classification Search
None
See application file for complete search history.

(56) References Cited

U.S. PATENT DOCUMENTS

| | | |
|---|---|---|
| 5,945,817 A | 8/1999 | Nguyen |
| 7,363,517 B2 | 4/2008 | Bodas |
| 8,212,542 B2 | 7/2012 | Huang et al. |
| 2006/0161794 A1 | 7/2006 | Chiasson et al. |
| 2006/0190532 A1 | 8/2006 | Chadalavada |
| 2006/0212143 A1 | 9/2006 | Nguyen et al. |
| 2008/0162973 A1 | 7/2008 | Landry et al. |
| 2009/0217060 A1* | 8/2009 | Tsuchiya ............... G06F 1/3203 713/300 |
| 2009/0254768 A1 | 10/2009 | Livescu et al. |

(Continued)

OTHER PUBLICATIONS

Intel Remote Management Module 3, Technical Product Specification, May 2010, 20 pgs.

(Continued)

*Primary Examiner* — Kim Huynh
*Assistant Examiner* — Joshua Neveln
(74) *Attorney, Agent, or Firm* — Egan Peterman Enders Huston

(57) ABSTRACT

Systems and methods are disclosed that may be used for controlling information handling system power supply based on current system power policy such as current system load power need and/or based on current system load power capping information. The disclosed systems and methods may be so implemented to improve power use efficiency for information handling system applications in which a power supply unit (PSU) has a power delivery capability that is overprovisioned relative to the power-consuming system load component/s of an information handling system.

20 Claims, 3 Drawing Sheets

(56) References Cited

U.S. PATENT DOCUMENTS

| | | |
|---|---|---|
| 2010/0038963 A1 | 2/2010 | Shetty et al. |
| 2010/0070787 A1 | 3/2010 | Bieswanger et al. |
| 2010/0100756 A1 | 4/2010 | Rahardjo |
| 2010/0250973 A1 | 9/2010 | Breen et al. |
| 2010/0332873 A1 | 12/2010 | Munjal et al. |
| 2011/0144818 A1 | 6/2011 | Li et al. |
| 2012/0216055 A1 | 8/2012 | Dumas et al. |
| 2013/0124885 A1 | 5/2013 | Davis et al. |
| 2014/0208136 A1 | 7/2014 | Rahardjo et al. |

OTHER PUBLICATIONS

Intel Intelligent Power Node Manager 1.5, External Interface Specification Using IPMI, Dec. 2009, 88 pgs.

Hormuth, "Systems and Methods for Dynamic Power Allocation in an Information Handling System Environment", U.S. Appl. No. 13/477,837, filed May 22, 2012, 40 pgs.

* cited by examiner

US 9,904,351 B2

SYSTEMS AND METHODS FOR POWER SUPPLY CONFIGURATION AND CONTROL

This application is a continuation of pending U.S. patent application Ser. No. 13/746,113, filed on Jan. 21, 2013 and entitled "Systems And Methods For Power Supply Configuration And Control," the entire disclosure of which is incorporated herein by reference.

FIELD OF THE INVENTION

This application relates to information handling systems, and more particularly to power supplies for information handling system components.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may be provided with a main power supply unit (PSU) that provides power to multiple components of the system. Similarly, multiple information handling systems, such as servers, may be grouped together in a rack system powered by a common main PSU, e.g., such as for data center implementations. Either way, power requirements for a main PSU may change (e.g., increase) over time as power-consuming components are added. For example, additional power-consuming components may be later added to a given information handling system to result in increased total system power consumption from a single system PSU (e.g., such as general-purpose computing on graphics processing units and/or host bus adapters may be added when future network infrastructure allows higher bandwidth). Similarly, additional server systems (e.g., server blades) may be later added to a given rack server system to increase the total rack system power consumption from a rack system PSU. To accommodate the ability for such system expansion, main PSU's for information handling systems (or rack systems) are sometimes intentionally overprovisioned, i.e., by providing a main PSU having a higher power-supply capacity than initially required by system power-consuming components in order to provide enough power capability to accommodate future upgrades.

Power capping is a technique in which individual system power-consuming components (e.g., such as central processing units or rack server blades) are each assigned a maximum capped power usage level that it cannot ever exceed, such that the total power consumption of all system components when operating together at their maximum capped power levels does not exceed a given power level, which may be either the total power capacity of the main PSU or an assigned reduced power level for the main PSU when a main PSU is overprovisioned. In one example, during operation of a server rack, a baseboard management controller (BMC) of each given server monitors real time power consumption of the given server and issues commands to the information handling unit of the given server to limit CPU, memory, storage, networking power consumption below the assigned power cap for the given server by adjusting operating conditions of the information handling unit of the given blade server.

SUMMARY OF THE INVENTION

Disclosed herein are systems and methods for controlling information handling system power supply based on current system power policy such as current system load power need and/or based on current system load power capping information, e.g., to optimize power supply efficiency based on current system load power need and/or based on current system load power capping information. The disclosed systems and methods may be advantageously implemented in one embodiment to improve power use efficiency for information handling system applications in which a power supply unit (PSU) has a power delivery capability that is overprovisioned relative to the power-consuming system load component/s of an information handling system. In one exemplary embodiment, the disclosed systems and methods may be implemented with an overprovisioned PSU that is employed in combination with power-capping capability for a configuration of one or more power-consuming system load components of an information handling system. An overprovisioned PSU capability includes a system configuration in which one or more PSU's are provided for the system that each have a maximum power supply capacity that is higher or much higher than the total maximum power consumption of the system load component/s, or alternatively that is higher or much higher than the total combined power-capped power consumption of the system load component/s.

In one embodiment, an overprovisioned PSU capability may be intentionally provided for an information handling system in order to ensure sufficient power supply capacity exists to supply power for existing (e.g., original) power-consuming system load component/s together with additional power-consuming system load component/s later added to the system, and/or to power upgraded power-consuming system load component/s having higher power consumption rate than the existing (e.g., original) power-consuming system load component/s. Examples of additional power-consuming components that may be later added to a given information handling system to result in increased total system power consumption from a single PSU include, but are not limited to, general-purpose computing on graphics processing units (GPGPU), host bus adapters (HBA), etc. Similarly, additional server systems (e.g., server blades) may be later added to a given rack server system to increase the total rack system power consumption from a rack system PSU. In another embodiment, a PSU may have a maximum power supply capacity that is properly sized for total maximum power consumption of the system load component/s, but nonetheless operated in an overprovisioned manner by virtue of power-capping that reduces the real time total power consumption of the system load component/s.

As an illustration of conventional PSU overprovisioning, an information handling system may be initially configured with a maximum power consumption draw of about 300 Watts, but provided with a PSU having a maximum power supply capacity rating of about 1100 Watts in anticipation of future additional power-consuming components or future component upgrades. Alternatively, the maximum power consumption draw of the system load components may be limited to a reduced value by power-capping. In any case, with such an initially overprovisioned (larger) conventional PSU, the initial system power efficiency will typically not be as high as it would be with a conventional PSU that is correctly sized for the initial system load or that is closer in power capacity to the initial system load than a conventionally overprovisioned PSU. In this example, at 300 Watts initial system power consumption, a conventional overprovisioned 1100 Watts-rated PSU will power the 300 Watts initial system load with about 92% efficiency, i.e., the conventional PSU will exhibit a power loss of about 8% or 24 Watts while powering the 300 Watts initial system load. In contrast, a more correctly sized conventional 400 Watts-rate PSU will power the 300 Watts initial system load with about 95% efficiency, i.e., the conventional PSU will exhibit a power loss of about 5% or 15 Watts while powering the same 300 Watts initial system load. Thus, using a conventional PSU configuration, 9 Watts of power are lost in this example due to the initial use of the overprovisioned PSU, rather than a correctly sized PSU that is configured to have an ability to operate to supply a maximum PSU power which matches with the maximum system power consumption draw.

Using the disclosed systems and methods, information handling system power policy information (e.g., such as power-capping information for the power-consuming component/s of an information handling system and/or system characterization information for an information handling system) may be used as a basis for controlling the internal power modes (e.g., power stages and/or other operating characteristics) of a given single PSU in a manner that increases real time operating efficiency of the given PSU based on the current power-capped value of the power-consuming component/s. In one exemplary embodiment, such power policy information (e.g., maximum allowable power-capped total system load and/or maximum potential total system power load) may be communicated (e.g., in real time) to one or more processing devices (that may be separate or integrated within the PSU, for example, as a microcontroller) that are configured to control the internal power modes of a single PSU in order to cause the processing device/s to so control the internal power modes of the PSU in the aforementioned manner. In this way, power efficiency of the PSU may be optimized with varying power policy information, and to use power capping to guarantee maximum system load. The disclosed systems and methods may also be advantageously implemented with an information handling system (e.g., a single rack server system) that is configured with single, dual, or more than two PSUs to power the system loads of the system.

Using the previous example to illustrate, power capping may be employed to limit the total maximum power consumption of the system load components to 300 Watts, and this information may be communicated (e.g., in real time) to an integrated or separate processing device controlling operating characteristics of the 1100 Watt-rated PSU. In response to this communicated power capping information, the processing device/s may be configured to control the PSU internal power mode of operation to match the reduced maximum power consumption of the system load components and to increase PSU power efficiency, e.g., by controlling the PSU to emulate the characteristics of a 300 Watt PSU or 400 Watt PSU for as long as the total maximum power consumption of the system load components is power capped to 300 Watts. Thus, using the disclosed systems and methods, a PSU having a much larger maximum power supply capacity rating (e.g., 1100 Watts) than a given current maximum system power consumption draw (e.g., 300 Watts) may be employed in order to accommodate for future increase in system power consumption draw (e.g., due to system power load expansion, system power utilization increase, and/or changes in system power capping levels), while at the same time implementing intelligence to case the PSU to currently operate like a 300 Watt power supply that is properly sized for the current maximum system power consumption draw.

In one respect, disclosed herein is an information handling system, including: one or more power-consuming components that together constitute a system load; at least one power supply unit (PSU) coupled to supply power to the system load, the PSU being configured to supply power to the system load using two or more available non-zero PSU operational power modes that each have a different respective deliverable power range; and at least one processing device. The at least one processing device may be configured to: determine a current power policy for the system load, the current power policy specifying a current power policy power level for the system load that corresponds to at least one of a total maximum possible power consumption level of the currently installed power-consuming components of the system load, a power-capped total power consumption level of the power-consuming components of the system load, or a combination thereof; select a first one of the PSU operational power modes of the at least one PSU based on the determined current power policy for the system load; and cause the PSU to supply power to the system load using the selected first one of the PSU operational power modes.

In another respect, disclosed herein is a method for powering an information handling system, the method including: providing one or more power-consuming components that together constitute a system load for the information handling system; and providing at least one power supply unit (PSU) coupled to supply power to the system load, the PSU being configured to supply power to the system load using two or more available non-zero PSU operational power modes that each have a different respective deliverable power range. The method may also include using the at least one processing device to: determine a current power policy for the system load, the current power policy specifying a current power policy power level for the system load that corresponds to at least one of a total maximum possible power consumption level of the currently installed power-consuming components of the system load, a power-capped total power consumption level of the power-consuming components of the system load, or a combination thereof; select a first one of the PSU operational power modes of the at least one PSU based on the determined current power policy for the system load; and cause the PSU to supply power to the system load using the selected first one of the PSU operational power modes.

DESCRIPTION OF ILLUSTRATIVE EMBODIMENTS

Figure 1:
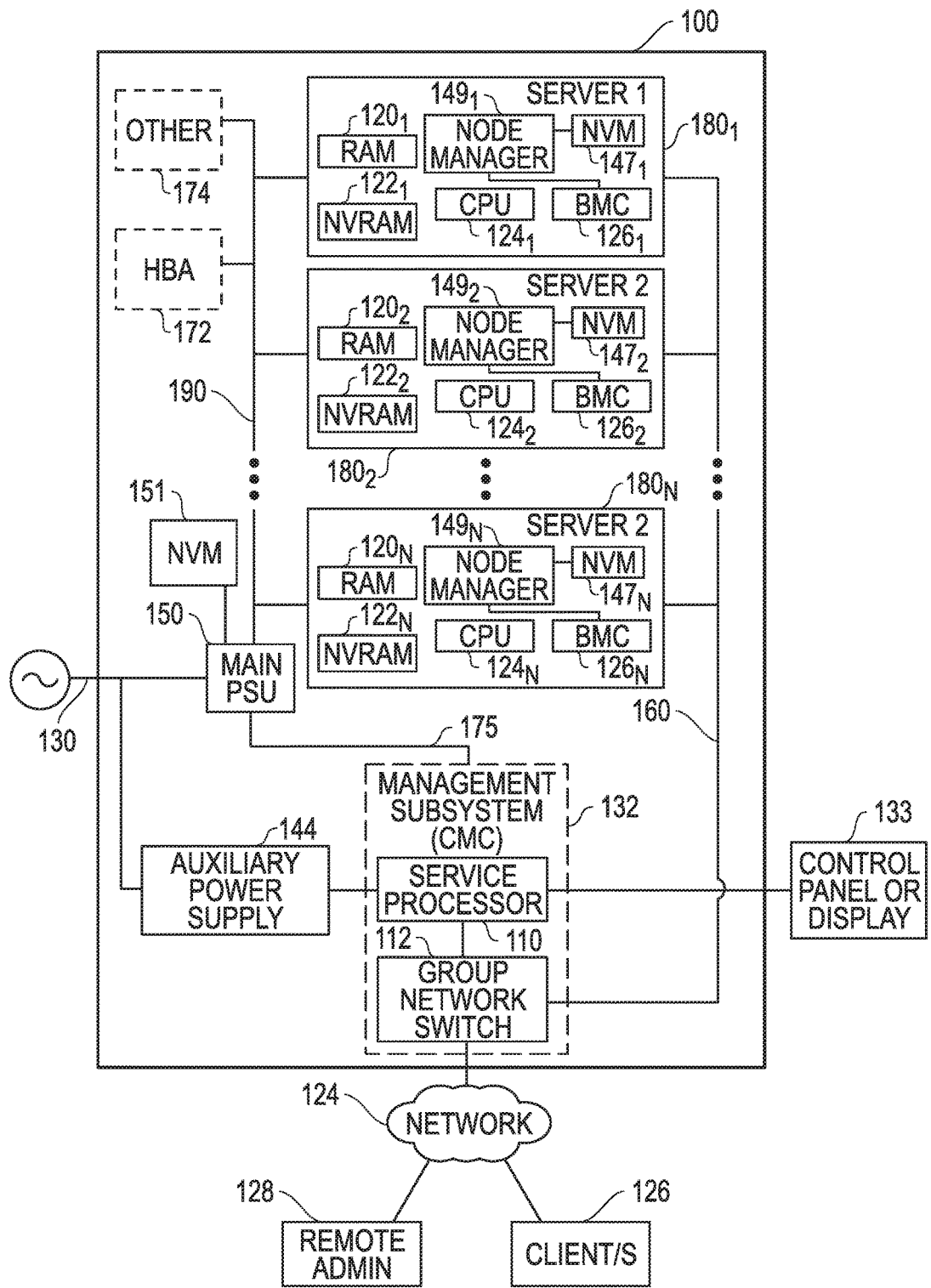
FIG. 1 is a simplified block diagram of an information handling system as it may be configured according to one exemplary embodiment of the disclosed systems and methods.

FIG. 1 is a block diagram illustrating one exemplary embodiment of an information handling system configured in the form of a server rack system 100 having multiple power-consuming components 172, 174 and $180_1$-$180_N$ that are coupled as a system load to be powered by a main power supply unit (PSU) 150 across main power supply rail 190. In this embodiment, individual power-consuming components 172, 174 and/or 180 may be added and/or removed from the system 100 over time so as to change (i.e., decrease or increase) the total system load power consumption need from PSU 150 at any given time. Moreover, it is additionally or alternatively possible that one or more of the individual power-consuming components 172, 174 and/or 180 may be assigned a maximum capped power usage level that it cannot exceed until the value of the maximum capped power usage level is changed, i.e., increased or decreased. Thus the total amount of power needed from main PSU 150 to power the system load of system 100 may change over time.

It will be understood that although FIG. 1 illustrates a particular exemplary embodiment in which the disclosed systems and methods are implemented with a rack server system 100, the disclosed systems and methods may be alternatively implemented with any other configuration of information handling system that utilizes one or more PSUs to provide power to a system load that is changeable over time, e.g., due to a change in number or identity of system load components and/or due to change in individual component power requirements due to power-capping. In this regard, suitable information handling system configurations may be characterized, for example, as monolithic, tower, modular, etc. Examples of other types of information handling system with which the disclosed systems and methods may be implemented include, but are not limited to, desktop computer systems, portable computer systems such as notebook computers, etc.

Referring to FIG. 1 in more detail, system 100 includes a plurality of information handling system nodes configured in the form of blade servers $180_1$ to $180_n$. As shown, in this exemplary embodiment each of blade servers $180_1$ to $180_n$ includes at least one respective central processing unit (CPU) 124 executing an in-band (e.g., host) operating system (OS) and at least one respective baseboard management controller (BMC) 126 executing out-of-band programming and coupled to the corresponding CPU 124 of the same blade server 180. Each of blade servers $180_1$ to $180_n$ also includes random access memory (RAM) 120 and non-volatile random access memory (NVRAM) 122 that may be present for purposes of saving and/or retrieving information used by the corresponding CPU 124 and/or BMC 126 of the same blade server 180. Besides BMC 126, it will be understood that any other suitable out-of-band processing device (e.g., service processor, embedded processor, etc.) may be employed to perform out-of-band operations using one or more out-of-band processing devices that are separate and independent from any in-band host central processing unit (CPU) that runs the host OS of the information handling system, and without management of any application executing with a host OS on the host CPU. It will be understood that the particular illustrated components of each blade server 180 are exemplary only, and that additional, fewer, and/or alternative components may be present, e.g., each server blade 180 may include multiple CPUs, etc.

Together, components 124, 126, 120 and 122 of each given blade server 180 of FIG. 1 represents a system load of that given blade server that requires electric power to operate, it being understood that a system load of an information handling system may include fewer, additional and/or alternative electrical power-consuming components in other embodiments. As described further herein, at least one power-consuming component of a given information handling system node may be configured with a variable power-consumption capability, such that the overall power requirements for the given information handling system node may be controlled in real time, e.g., by control signal or other type of command. For example, power consumption of a CPU 124 of a given blade server 180 may be varied using control signals provided by a respective BMC 126 of the given blade server 180.

In the illustrated embodiment of FIG. 1, main power supply unit (PSU) 150 is configured to receive AC power 130, perform AC/DC power conversion, and provide DC power to the system load of each blade server 180 and other optional components 172 and 174 by main power supply rail 190. In one embodiment, the main PSU 150 may be alternatively and/or additionally configured to receive DC power, and perform DC/DC power conversion for system 100. Moreover, in this embodiment PSU 150 is also configured to supply a controllably variable amount of power to main power supply rail 190 for powering components 172, 174 and 180. For example, PSU 150 may be configured with two or more different non-zero (i.e., other than the "power off") operational power modes, e.g., such as high power mode, medium power mode, and light power mode. In one embodiment, an integrated PSU microcontroller may be provided that is configured to control operation of PSU 150 to cause PSU 150 to operate with a given one of the non-zero operational power modes.

In one exemplary embodiment, PSU 150 may be configured with non-volatile or other suitable memory 151 that is separate or integrated with PSU 150, and upon which one or more look-up tables are stored that contain PSU operation parameters that correspond to and enable the power characteristics of each operational power mode. Memory 151 may be coupled to be accessible to a PSU microcontroller when present, and the PSU microcontroller may access memory 151 to select the appropriate PSU operation parameters corresponding to a desired PSU operational power mode. Examples of such PSU operating parameters that may be stored in such look-up tables include, but are not limited to, switching frequency, active asymmetric power stage, phase-shedding, Power Factor Correction (PFC) operational state, Power Stage mode, etc. In an alternative embodiment, PSU 150 may be configured with three or more different such operational power modes as described above. It will be understood that it is also optionally possible that a system 100 may include multiple PSUs 150 that are each coupled to supply power to system load components of system 100, and that are each configured with multiple different operational power modes that are selectable by a node manager 149 in a manner as will be described further herein.

The amount of operating power required by the components of each given blade server 180 of this exemplary embodiment may vary over time depending, for example, on the current processing load handled by the respective CPU 124 of the given blade server 180, and the frequency of reads and writes to RAM 120 and NVRAM 122 as required by clients of the server 180. Each of blade servers 180 may be assigned a maximum rated operating power (label rated power) by the server manufacturer or supplier. This maximum rated operating power level represents the expected worst-case highest power consumption of the components of the server blade 180. Instantaneous operating power consumed by each given one of blade servers 180 may be controlled, for example, by adjusting operating frequency of the CPU (plus other elements, limiting DRAM BW, network link speed and bandwidth, putting hard drives in sleep states) 124 (and therefore voltage and power consumption) of the given blade server 180. Commands to control power consumption may be transmitted, for example, from the corresponding BMC 126 to the respective CPU 124 of each given blade server 180.

In one exemplary embodiment, main PSU 150 may be configured with a maximum rated output power that corresponds to the maximum power level capacity that PSU 150 is designed to provide. To ensure that the maximum power level capacity of PSU 150 is not exceeded, each of blade servers 180 may be assigned an individual maximum capped power consumption level such that the maximum rated output power of main PSU 150 is not exceeded by the total power consumption of the individual servers 180 of the group when every one of the servers 180 is each consuming its individual maximum capped power consumption level.

As further shown in FIG. 1, server rack system 100 may include a management subsystem or Chassis Management Controller (CMC) 132 that includes an embedded service management processor 110 (e.g., such as a BMC microcontroller or any other suitable type of processing device) together with an optional network switch 112 that interfaces with external entities across network 124, e.g., Internet, corporate intranet, etc. In one embodiment, embedded service management processor 110 may be employed to perform the processing tasks described herein for management subsystem (CMC) 132. Further, management subsystem (CMC) 132 may also include integral non-volatile memory (e.g., such as NVRAM) coupled to embedded service management processor 110 and/or embedded service management processor 110 may be coupled to external non-volatile memory, in either case to facilitate the accomplishment of tasks of management subsystem (CMC) 132 as described further herein. As shown, an optional auxiliary power source 144 may be provided to run independently of the main PSU 150 and to convert AC power 130 and provide auxiliary DC power (Vaux) to management subsystem 132 and service processor 110. As shown, the BMC 126 of each blade server 180 is configured to communicate with external entities via network 124 across network connection 160 and network switch 112.

As shown, management subsystem (CMC) 132 may be coupled via network 124 to remote administrator/s 128 and/or one or more clients 126 (e.g., other information handling systems) and/or to an optional local control panel and/or display 133 for displaying information and for local administrator interface to server rack system 100. In one embodiment, management subsystem 132 may provide local and/or remote control, reproduction and display of server operating parameters, for example, by out of band methods such as Web graphical user interface (GUI) using an integrated Dell Remote Access Controller (iDRAC) available from Dell Products L.P. of Round Rock, Tex. and/or textually via Intelligent Platform Management Interface (IPMI), Dell Remote Access Controller (RACADM) or WS Management (WS-MAN). Further information on remote access controllers may be found in United States Patent Application Publication Number 2006/0212143 and United States Patent Application Publication Number 2006/0190532, each of which is incorporated herein by reference in its entirety. However, it will be understood that other configuration of remote access controllers may be suitably employed in other embodiments.

Still referring to the exemplary embodiment of FIG. 1, management subsystem (CMC) 132 is coupled to communicate with PSU 150 by a communication bus 175 (e.g., power management bus "PMBus"). However, it will be understood any other type or combination of types of suitable communication media may be employed for such purposes. As further shown in FIG. 1, each of blade servers $180_1$ to $180_n$ may include a respective node manager 149 configured for communication with management subsystem 132 via a respective BMC 126 of the same server 180. In such an embodiment, each node manager $149_1$ to $149_n$ may report or request power-related configuration information to its corresponding BMC $126_1$ to $126_n$, which in turn may exchange power-related configuration information with management subsystem (CMC) 132 of system 100 across any suitable communication path (e.g., bus), such as path 160 of FIG. 1. Management subsystem 132 is in turn configured to communicate power-related configuration information to and from PSU 150 across communication bus 175. In this way, the communication architecture of FIG. 1 may be employed to use power-related configuration information (e.g., requests, commands, power modes, etc.) to implement power supply configuration and control according to the disclosed systems and methods. In one exemplary embodiment, each node manager 149 may be implemented by a chipset, e.g., such as an Intel C600 Patsburg Node-Manager, or in a separate host I/O controller, or a dedicated microprocessor, etc. However, it will be understood that the tasks of one or more node manager/s 149 may be alternatively performed, for example, by service processor 110 or other processing device within management subsystem 132, and/or by a processing device integrated within PSU 150, etc.

It will be understood that the system and communication architecture embodiment of FIG. 1 is exemplary only and that any other configuration of system components and/or communication architecture may be employed that is suitable for implementing the disclosed systems and methods. For example, in an alternative embodiment (e.g., such as may be implemented for a monolithic or rack system configuration that does not have a management subsystem (CMC) 132), each given node manager 149 may be configured to communicate directly with a given PSU 150 via a suitable provided communication path and each given BMC 126 may be configured to communicate with the PSU 150 through (proxied) a corresponding Node Manger 149, e.g., in the event that BMC wants to configure one or more power parameter/s. It will be understood that in one embodiment, only one node manager 149 and corresponding BMC 126 may be provided.

Using one exemplary embodiment, the current operation mode of an overprovisioned PSU 150 may be adjusted in real time to maximize efficiency of the PSU 150 based on real time power capping information for system 100. This may be accomplished as further described herein by using management subsystem 132 of FIG. 1 to gather real time power capping information through BMCs 126 from node managers 147, and then to select and pass commands across bus 175 to cause PSU 150 to change to an available PSU operating mode that is selected by management subsystem 132 based upon the real time real time power capping information for system 100, e.g., a selected operational power mode having highest efficiency under the current real time system load conditions (capped or non-capped). PSU 150 may change its operational mode using any circuitry and/or technique suitable for adjustably controlling power supplied across main power supply rail 190, for example, by adjusting the number of DC-DC regulator phases, increasing switching frequency, migrating the active power stage to the one specifically optimized for low power and higher efficiency (for example, lower AC loss), etc.

In another embodiment having no management subsystem (CMC) 132 (e.g., such as monolithic or rack server system architecture having only node managers 149 and respective corresponding BMCs 126), each node manager 149 may cooperate to gather real time power capping information from BMCs 126, and then to collectively select and pass commands to PSU 150 to cause PSU 150 to change to an available PSU operating mode that is selected by node manager/s 149 based upon the real time real time power capping information for system 100, e.g., a selected operational power mode having highest efficiency under the current real time system load conditions (capped or non-capped). As with the previous embodiment, PSU 150 may change its operational mode using any circuitry and/or technique suitable for adjustably controlling power supplied across main power supply rail 190, for example, by adjusting the number of DC-DC regulator phases, increasing switching frequency, migrating the active power stage to the one specifically optimized for low power and higher efficiency (for example, lower AC loss), etc. In this regard, although disclosed systems and methods are described below in terms of actions taken by management subsystem 132, it will be understood that one or more node managers 149 may individually or collectively implement the disclosed systems and methods in those architectures that do include a management subsystem (CMC) 132 (e.g., such as monolithic or rack server system architectures).

As shown for the exemplary embodiment of FIG. 1, management subsystem 132 may be configured to communicate with PSU 150 across bus 175 to determine the different available power supply operational modes of same, e.g., number and identity of different PSU power modes of operation with each power mode having a different maximum power level capability and efficiency. Management subsystem 132 may also be configured to communicate with node managers 149 and BMCs 126 to determine the current real time combined system load requirements of the power-consuming components of system 100 (e.g., the current combined total power consumption capability of system load components of system 100, the current real time requested capped power requirements for the system load components of system 100, etc.).

Management subsystem CMC 132 may then be configured to compare the determined current real time combined system load requirements of the power-consuming components of system 100 with characteristics of the different available power supply modes of PSU 150. Based upon this comparison, management subsystem CMC 132 may send a command to PSU 150 across bus 175 that requests that PSU 150 operate using a specific one of the available power supply operational power modes of that has been selected by management subsystem CMC 132 based on determined current real time combined system load requirements of the power-consuming components of system 100. For example, management subsystem CMC 132 may select an available operational power mode of operation of PSU 150 based on a pre-specified relationship (e.g., look up table or algorithm) between optimum power mode of operation of PSU 150 and the determined current real time combined system load requirements of the power-consuming components of system 100. PSU 150 may then respond to the received command from management subsystem CMC 132 by altering its current operational mode, e.g., by changing from the existing power mode of operation to the newly requested power mode of operation. Management subsystem CMC 132 may continuously perform this operation such that the operational mode of PSU 150 is continuously adjusted (e.g., and optimized) based on the determined current real time total system load requirements of the power-consuming components of system 100. This determined real time total system load requirements may be the current real time power capped load requirement and/or the current total system load requirement based on changing number of installed power-consuming components in system 100.

Figure 2:
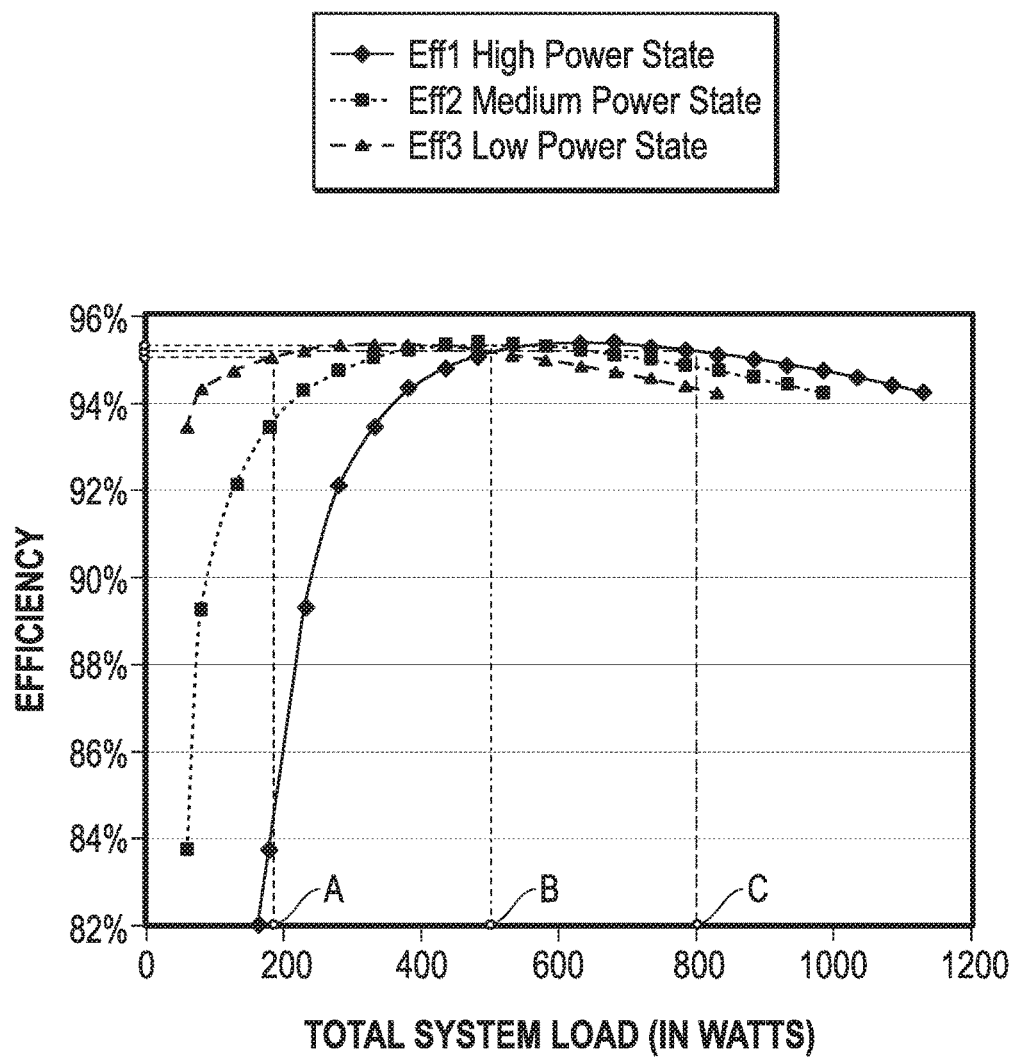
FIG. 2 illustrates a correlation between total system load and PSU efficiency according to one exemplary embodiment of the disclosed systems and methods.

FIG. 2 illustrates an example correlation between total system load and PSU efficiency (defined as ratio or percentage of input power over output power) for an exemplary embodiment in which an 1100 watt rated PSU 150 is capable of three operational modes, i.e., high power mode, medium power mode, and low power mode. Such a correlation may be stored, for example, within non-volatile memory that is accessible by management subsystem 132 (or in non-volatile memory 147 when node manager/s 149 implement the disclosed systems and methods for a system that does not have a management subsystem 132). Management subsystem 132 may access such a stored correlation to determine in real time the current desired power mode for PSU 150 based on current real time total system load (capped or non-capped). Such a correlation may be determined, for example, based on empirical testing of PSU 150 and may be stored in any suitable form (e.g., lookup table, algorithm, function such as polynomial equation/s, etc.) within memory for access by management subsystem 132 and/or node manager 149. In this regard, memory 147 may be separate from node manager 149 as illustrated, or may be integral to node manager 149 (e.g., as firmware).

Still referring to FIG. 2, during operation of system 100 management subsystem 132 may access the power efficiency correlation of FIG. 2 to determine which power mode (i.e., high, medium, or low power mode) of PSU 150 exhibits the highest efficiency for the determined current real time total system load of system 100. In this regard, management subsystem 132 may in one exemplary embodiment identify multiple candidate PSU operation power modes having a deliverable power range that coincides with the current power policy power level but that each have operating PSU efficiency at the current power policy power level, and then may further select one of the candidate PSU operational power modes that has having the highest operating efficiency at the current power policy power level. For example, given a determined current real time total system load of about 180 watts (see point A on FIG. 2), the PSU low power mode exhibits the highest resulting efficiency of about 95%. Similarly, given a determined current real time total system load of about 490 watts (see point B on FIG. 2), the PSU medium power mode exhibits the highest resulting efficiency of about 95%, and given a determined current real time total system load of about 800 watts (see point C on FIG. 2), the PSU high power mode exhibits the highest resulting efficiency of about 95%.

In another possible embodiment, management subsystem 132 or other suitable processing device may be configure to select a given PSU operational power mode from multiple available PSU operational power modes such that the deliverable power range of the selected PSU operational power mode coincides with the current power policy power level. For example, a lookup table such as shown in Table 1 below may be employed that specifies PSU power mode based on determined current real time total system load.

TABLE 1

| Determined Total System Load (watts) | PSU Power mode |
|---|---|
| 0 to 399 | Low |
| 400 to 699 | Medium |
| 700 to 1100 | High |

Table 2 illustrates one exemplary embodiment of a PSU power mode lookup table as it may be configured to contain internal operating parameter values (e.g., such as values representing number of DC-to-DC phases, switching frequency, number of active unequal phases, PFC operation, etc.) for implementing each of three possible power modes for PSU 150, e.g., high power mode, medium power mode, and low power mode. In this exemplary embodiment, internal operating parameters include switching frequency, number of active phases, and "other parameters" 3, 4 and 5. Examples of such other parameters include, but are not limited to, PFC voltage, number of phases in Power Stage, etc. As previously described, such a lookup table may be stored on non-volatile memory 151 or other suitable location for access by PSU 150 in response to receipt of a command from management subsystem 132 to implement one of the three possible power modes. PSU 150 may access such a lookup table and retrieve the combination of operating parameter values corresponding to the indicated power mode, and then implement the indicated power mode using the retrieved operating parameter values. It will also be understood that a lookup table such as Table 2 is exemplary only, and that PSU operating parameter values for implementing different available PSU power modes may be stored or otherwise defined in any other form (e.g., as one or more functions such as polynomial equations, etc.) that is suitable for access by a PSU to allow the PSU to implement a given selected power mode.

TABLE 2

| PSU Power mode | switching_freq | #active phase | other parameter 3 | other parameter 4 | other parameter 5 |
|---|---|---|---|---|---|
| High | F1 (e.g., 40 KHz) | P1 example 1 | X1 | Y1 | Z1 |
| Medium | F2 (e.g., 50 KHz) | P2 example 2 | X2 | Y2 | Z2 |
| Low | F3 (e.g., 60 KHz) | P3 example 3 | X3 | Y3 | Z3 |

Figure 3:
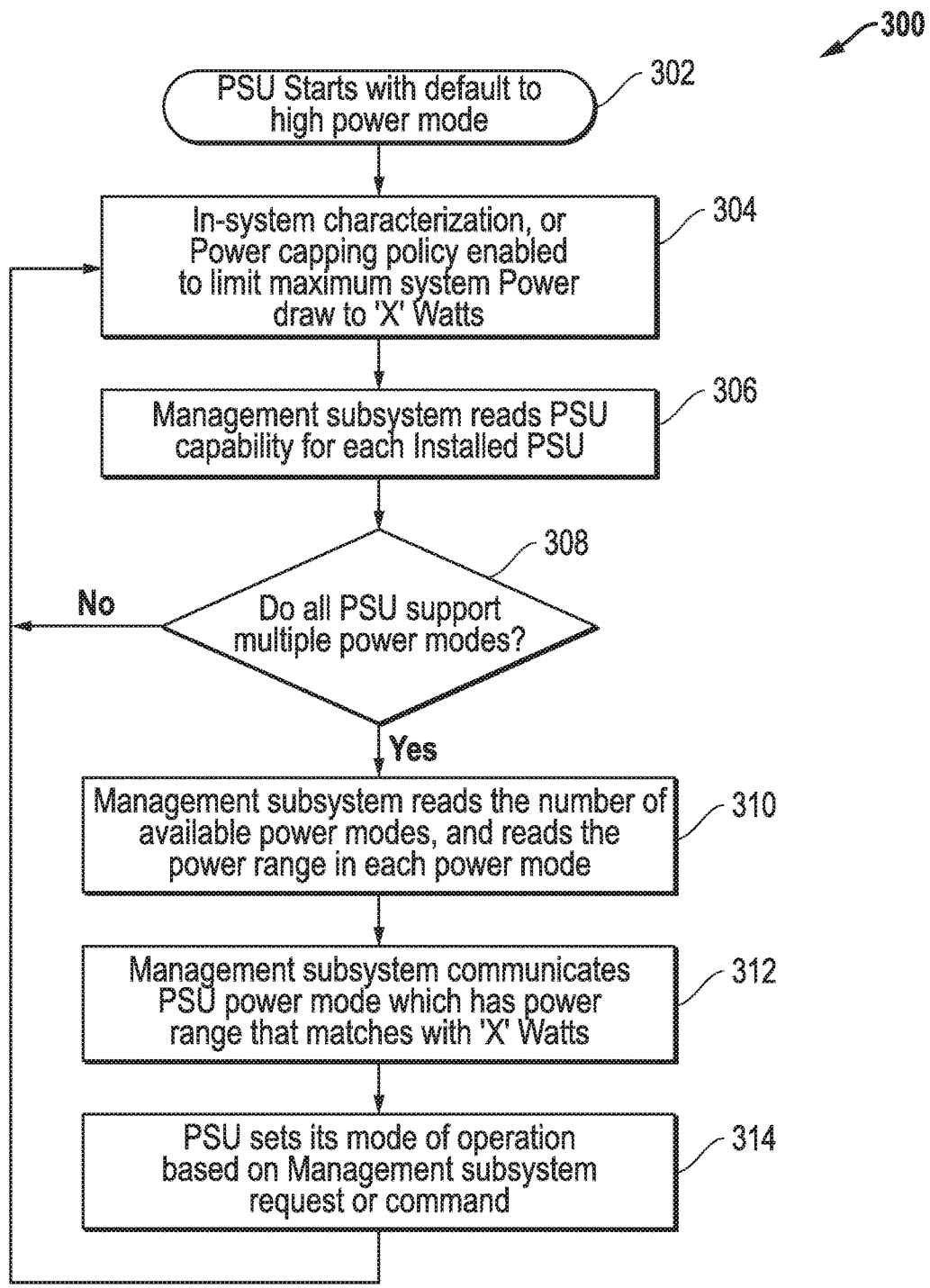
FIG. 3 illustrates methodology according to one exemplary embodiment of the disclosed systems and methods.

FIG. 3 illustrates one exemplary embodiment of methodology 300 that may be implemented to optimize power supply efficiency based on current system load power needs and/or based on current system load power capping information gathered by management subsystem 132 of system 100 of FIG. 1. Although described below in relation to system 100 of FIG. 1, it will be understood that methodology 300 may be implemented to optimize power supply efficiency for any other information handling system configuration that employs one or more PSUs to power system loads having power consumption needs that vary over time, e.g., due to change in the types or number of system load components and/or due to power-capping of system load components). In this regard, one or more node managers 149 or other suitable processing devices (e.g., controller, microcontroller, FPGA, ASIC, processor, microprocessor, etc.) may alternatively perform the described tasks of management subsystem 132 (including the steps of FIG. 3 indicated performed by management subsystem 132) in those embodiments that do not include a management subsystem 132. Thus, in one exemplary embodiment, node manager/s 149 may communicate with PSU 150 to implement the steps of FIG. 3 that are described for management subsystem 132. In such an embodiment, it is also possible that where multiple node managers 149 are present, one node manager 149 may be optionally designated as a master node manager for communicating information with PSU 150 (e.g., for reading PSU power capability and power modes in steps 306 and 310, writing selected power mode to PSU 150 in step 310, etc.).

As shown in FIG. 3, PSU 150 starts methodology 300 by defaulting to its high power mode (e.g., see Table 1) in step 302. Next, in step 304, in-system power characterization and/or power-capping policy information is received by management subsystem 132 (e.g., through BMCs 126 from node managers 147), which may set the power capping policy for the information handling system 100. From this information received in step 304, management subsystem CMC 132 determines the current real time maximum total system power draw (e.g., "X" watts in this case). This maximum total system power draw may be the total possible (uncapped) system load for all of the existing system load components of system 100 taken together, or may be a power-capped total system load value when power capping is implemented by system 100. In one embodiment, an in-system characterization may be performed, for example, by system BIOS running a proprietary command coordinated with management subsystem (CMC) 132. Such an in-system characterization may be so performed to measure (e.g., stress test) the maximum power consumption of system loads of the system 100 (e.g., multiple power-consuming components 172, 174 and $180_1$-$180_N$ of FIG. 1). Power-capping setting information may be specified to management subsystem 132 by a user (e.g., via network 124 by remote administrator/s 128 or via optional local control panel 133), or in any other suitable manner.

Next, in step 306, management subsystem (CMC) 132 then interrogates PSU 150 (or each of multiple PSUs 150 where present) across PMBus 175 or other suitable communication medium to determine power mode capability of each installed PSU 150, and each PSU 150 reports its available power mode capability. Then in step 308 management subsystem (CMC) 132 determines whether all PSUs 150 currently support multiple power modes (e.g., multiple power modes). If not, then methodology 300 returns to step 304 as shown and repeats starting again from that step. However, if in step 308 it is determined that multiple power modes are supported by all PSUs 150 that are present in system 100, then in step 310 management subsystem (CMC) 132 reads the available power modes (e.g., reads the number of available PSU power modes and corresponding power range for each power mode such as illustrated in Table 1 from memory coupled to management subsystem (CMC) 132). Management subsystem (CMC) 132 then compares the determined current real time maximum total system power draw ("X" watts) from step 304 to the available PSU power modes, and selects the power mode that corresponds to the current real time maximum total system power draw. For example, given a determined 500 watts, management subsystem (CMC) 132 would select the medium PSU power mode from Table 1.

Next, in step 312, management subsystem (CMC) 132 writes the selected power mode from step 310 to PSU 150, e.g., across PMBus 175 using Set_Power_Mode_Command or using any other suitable control signal/s transmitted across any other suitable communication medium. In step 314, PSU 150 may access the PSU operational parameter/s corresponding to the selected power mode received in step 312 from the management subsystem (CMC) 132 (e.g., by accessing the lookup table of Table 2 that may be stored on NVM 151) and then switch or transition to the selected requested power mode. For example, where the selected operating mode is the medium PSU power mode of Table 1, PSU 150 may consult the operating parameters of Table 2 that correspond to the medium power mode (e.g., F2, P2, X2, Y2, Z2) and change its internal operating parameters to these values to cause PSU 150 to operate using the medium power mode. Methodology 300 then returns to step 304 and repeats as shown.

Table 3 below shows possible PMBus command registers that may be employed in one exemplary embodiment corresponding to the PSU power modes of Table 1 to implement the methodology of FIG. 3.

TABLE 3

| PMBus Command Register | Description |
| --- | --- |
| MFR_SPECIFIC (Power_mode_Capability) | Contains the number of supported power modes |
| MFR_SPECIFIC (High_Power_mode_range) | Contains the range of High power mode (for example, 700 W-1100 W) |
| MFR_SPECIFIC (Med_Power_mode_range) | Contains the range of Medium power mode (for example, 400 W-699 W) |
| MFR_SPECIFIC (Low_Power_mode_range) | Contains the range of Low power mode (for example, 0 W-399 W) |
| MFR_SPECIFIC (Read_current_Power_mode) | Node Manager may read from this register to get the current power mode |
| MFR_SPECIFIC (Set_current_Power_mode) | Node Manager may write to this register to set the request power mode |

It will be understood that methodology 300 is exemplary, and that any other order of steps and/or any other combination of alternative, additional, and/or fewer steps may be employed that are suitable for optimizing power supply efficiency based on current system load power need and/or based on current system load power capping information. Moreover, it will also be understood the embodiment of FIG. 1 is exemplary only, and that one or more steps or tasks of the techniques and methodology disclosed herein (e.g., such as described herein for management subsystem 132, node manager 149 and/or PSU 150) may be implemented by one or more processing devices (e.g., processor, microprocessor, controller, microcontroller, ASIC, FPGA, CPU, etc.).

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
   one or more power-consuming components that together constitute a system load having a maximum total system power draw for all of the power-consuming components taken together;
   at least one power supply unit (PSU) coupled to supply power to the system load, the PSU being overprovisioned to have a maximum power supply capacity that is higher than the maximum total system power draw for all of the power-consuming components of the system load taken together; and
   at least one processing device configured to:
      first determine the maximum total system power draw of all of the one or more power-consuming components of the system load taken together; and
      then select a reduced PSU operational power mode from multiple PSU operational power modes to increase the PSU operating efficiency at the determined maximum total system power draw, the reduced PSU operational power mode being less than the PSU maximum power supply capacity; and
      then cause the PSU to supply power to the system load using the selected reduced PSU operational power mode.

2. The system of claim 1, where the at least one processing device is configured to determine the maximum total system power draw by performing an in-system characterization to measure the maximum power loads of each of the power-consuming components of the system load.

3. The system of claim 2, where the at least one processing device is configured to use system BIOS to perform the in-system characterization.

4. The system of claim 1, where the at least one processing device is configured to determine the maximum total system power draw from power-capping setting information for the system load.

5. The system of claim 1, where the at least one processing device is further configured to select a reduced PSU operational power mode that has the highest operating efficiency of all the multiple PSU operational power modes at the determined maximum total system power draw.

6. The system of claim 5, where the at least one processing device is further configured to:
   detect a change in the maximum total system power draw of all of the one or more power-consuming components of the system load taken together after causing the PSU to supply power to the system load using a selected first reduced PSU operational power mode; and
   then select a second and different reduced PSU operational power mode from the multiple PSU operational power modes that has the highest operating efficiency of all the multiple PSU operational power modes at the determined changed maximum total system power draw; and
   then cause the PSU to supply power to the system load using the selected second reduced PSU operational power mode.

7. The system of claim 1, where the determined maximum total system power draw is a determined total maximum possible power consumption level of all currently installed power-consuming components of the system load.

8. The system of claim 1, where the determined maximum total system power draw is a determined power-capped total power consumption level of all currently-installed power-consuming components of the system load.

9. The system of claim 1, where the system comprises a blade server system; where the one or more power-consuming components of the system load comprise individual server blades; where determine the maximum total system power draw varies according to the number of currently installed server blades; and where the at least one processing device is further configured to:
   select a different PSU operational power mode that has the highest operating efficiency of all the multiple PSU operational power modes at a different determined maximum total system power draw due to a change in the number of currently installed server blades or due to a change in the current power-capped power consumption level of the individual currently installed server blades, and
   then cause the PSU to supply power to the system load using the different selected PSU operational power mode.

10. The system of claim 1, where the at least one processing device is configured to select a given internal PSU operating parameter value from different internal PSU operating parameter values that corresponds to the selected reduced PSU operational power mode; and to cause the PSU to supply power to the system load using the selected internal PSU operating parameter value to implement the selected reduced PSU operational power mode; where the internal PSU operating parameter values comprise at least one of number of DC-to-DC phases, switching frequency, number of active unequal phases, Power Factor Correction (PFC) operational states.

11. A method for powering an information handling system, comprising:
   providing one or more power-consuming components that together constitute a system load having a maximum total system power draw for all of the power-consuming components taken together;
   providing at least one power supply unit (PSU) coupled to supply power to the system load, the PSU being over-provisioned to have a maximum power supply capacity that is higher than the maximum total system power draw for all of the power-consuming components of the system load taken together; and
   using the at least one processing device to:
      first determine the maximum total system power draw of all of the one or more power-consuming components of the system load taken together; and
      then select a reduced PSU operational power mode from multiple PSU operational power modes to increase the PSU operating efficiency at the determined maximum total system power draw, the reduced PSU operational power mode being less than the PSU maximum power supply capacity; and
      then cause the PSU to supply power to the system load using the selected reduced PSU operational power mode.

12. The method of claim 11, further comprising using the at least one processing device to determine the maximum total system power draw by performing an in-system characterization to measure the maximum power loads of each of the power-consuming components of the system load.

13. The method of claim 12, further comprising using the at least one processing device to use system BIOS to perform the in-system characterization.

14. The method of claim 11, further comprising using the at least one processing device to determine the maximum total system power draw from power-capping setting information for the system load.

15. The method of claim 11, further comprising using the at least one processing device to select a reduced PSU operational power mode that has the highest operating efficiency of all the multiple PSU operational power modes at the determined maximum total system power draw.

16. The method of claim 15, further comprising using the at least one processing device to:
   detect a change in the maximum total system power draw of all of the one or more power-consuming components of the system load taken together after causing the PSU to supply power to the system load using a selected first reduced PSU operational power mode; and
   then select a second and different reduced PSU operational power mode from the multiple PSU operational power modes that has the highest operating efficiency of all the multiple PSU operational power modes at the determined changed maximum total system power draw; and
   then cause the PSU to supply power to the system load using the selected second reduced PSU operational power mode.

17. The method of claim 11, where the determined maximum total system power draw is a determined total maximum possible power consumption level of all currently installed power-consuming components of the system load.

18. The method of claim 11, where the determined maximum total system power draw is a determined power-capped total power consumption level of all currently-installed power-consuming components of the system load.

19. The method of claim 11, where the system comprises a blade server system; where the one or more power-consuming components of the system load comprise individual server blades; where determine the maximum total system power draw varies according to the number of currently installed server blades; and where the method further comprises using the at least one processing device to:
select a different PSU operational power mode that has the highest operating efficiency of all the multiple PSU operational power modes at a different determined maximum total system power draw due to a change in the number of currently installed server blades or due to a change in the current power-capped power consumption level of the individual currently installed server blades, and
then cause the PSU to supply power to the system load using the different selected PSU operational power mode.

20. The method of claim 11, further comprising using the at least one processing device to select a given internal PSU operating parameter value from different internal PSU operating parameter values that corresponds to the selected reduced PSU operational power mode; and to cause the PSU to supply power to the system load using the selected internal PSU operating parameter value to implement the selected reduced PSU operational power mode; where the internal PSU operating parameter values comprise at least one of number of DC-to-DC phases, switching frequency, number of active unequal phases, Power Factor Correction (PFC) operational states.

* * * * *